United States Patent [19]

Ekman

[11] 4,084,614

[45] Apr. 18, 1978

[54] FLUID COUPLING DEVICE

[76] Inventor: Bror Fridolf Thure Ekman, Slalomvagen 12,, 541 00 Skovde, Sweden

[21] Appl. No.: 764,268

[22] Filed: Jan. 31, 1977

Related U.S. Application Data

[63] Continuation of Ser. No. 624,691, Oct. 22, 1975, abandoned.

[30] Foreign Application Priority Data

Oct. 30, 1974 Sweden .................................. 7413663

[51] Int. Cl.² ............................................. F16L 37/28
[52] U.S. Cl. ............................ 137/614.03; 137/614.04
[58] Field of Search ....................... 137/614.03, 614.04

[56] References Cited

U.S. PATENT DOCUMENTS

| | | | |
|---|---|---|---|
| 2,108,714 | 2/1938 | Hirsch et al. | 137/614.04 |
| 2,730,380 | 1/1956 | Espy et al. | 137/614.04 |

FOREIGN PATENT DOCUMENTS

| | | | |
|---|---|---|---|
| 663,132 | 4/1929 | France | 137/614.04 |
| 1,360,204 | 3/1964 | France | 137/614.03 |
| 585,087 | 11/1958 | Italy | 137/614.03 |
| 148,383 | 10/1931 | Switzerland | 137/614.04 |
| 1,245,134 | 9/1971 | United Kingdom | 137/614.04 |

Primary Examiner—Alan Cohan
Assistant Examiner—Gerald A. Michalsky
Attorney, Agent, or Firm—Pollock, Vande Sande & Priddy

[57] ABSTRACT

A fluid coupling device comprising two connectable parts each having a channel and a fluid flow blocking component which in unactivated position keeps the channel closed and in operated position keeps the channel open. A slidable push rod is provided which in the connected position of the parts, opens the flow blocking components and inter-connects the channels of the two parts. The push rod is provided with a flange having a combined stop- and counteracting surface which interacts with one of the parts; also has a separate flange surface which interacts with an actuating surface of the second part.

3 Claims, 8 Drawing Figures

FLUID COUPLING DEVICE

This is a continuation, of application Ser. No. 624,691, filed Oct. 22, 1975, now abandoned.

FIELD OF THE INVENTION

The present invention relates to a fluid coupling device comprising a first part having a first channel and a first flow blocking component which in an unoperated position of the device, keeps the first channel closed and also a second part which defines a second channel and a corresponding flow blocking component which, in an unoperated position of the device, keeps the second channel closed. In the connected position of the two parts the push rod becomes effective to open both the flow blocking components.

The above-mentioned first part may comprise a coupling component for measuring apparatus for or similar kind of equipment, whereas the second part may comprise, for example, a connection nipple in a system employing hydraulic oil, air, or some other medium as a working fluid. The system may be part of the control gear of machines of different kinds, e.g. digging machines, bucket loaders etc., in which it is desired to be able to measure the pressure at different points of the system at different times of its operation. Any nipple that is used and which corresponds to the second part is assumed to be rigidly arranged in the desired measuring point and it is intended that the above-mentioned first part of the coupling device of this invention shall be connectable to each such nipple in such a way that the system pressure can be applied without fluid loss to the measurement apparatus.

SUMMARY OF THE INVENTION

A first object of the present invention is to provide a design of the parts of the coupling so that there will be minimal interference with the desired flow pattern of the fluid medium, and that way false peaks originating from the construction of the coupling device is avoided on the pressure registering equipment. Thus, it is a feature of the coupling device of this invention that in its fully coupled condition, both of the fluid blocking components shall provide essentially identical openings for the flow of fluid.

A second object of the invention is to provide a suitable enclosing for the push rod in such a way that the coupling device will be leakproof.

A third object of the invention is to provide a design and housing for the push rod which prevents jolting of the push rod, which might otherwise impair the connection of the parts of the coupling device, or simply make the above-mentioned connection impossible. It is in this case to be observed that the coupling device is to be used in a workshop environment; the different parts of the device must provide a robust structure.

A fourth object with the invention is to provide a coupling unit which can be readily manufactured at low cost but with a high degree of reliability.

BRIEF DESCRIPTION OF THE DRAWINGS

In the drawings:

FIG. 3b is an end view of the push rod according to FIG. 3a.

FIGS. 3c-d are end views of modified forms of the push rod according to FIG. 3a.

FIG. 4b is an end view of the holder according to FIG. 4a.

In the drawings the parts which correspond to each other in the several views have been given the same reference number.

DESCRIPTION OF THE PREFERRED EMBODIMENT

Figure 1:
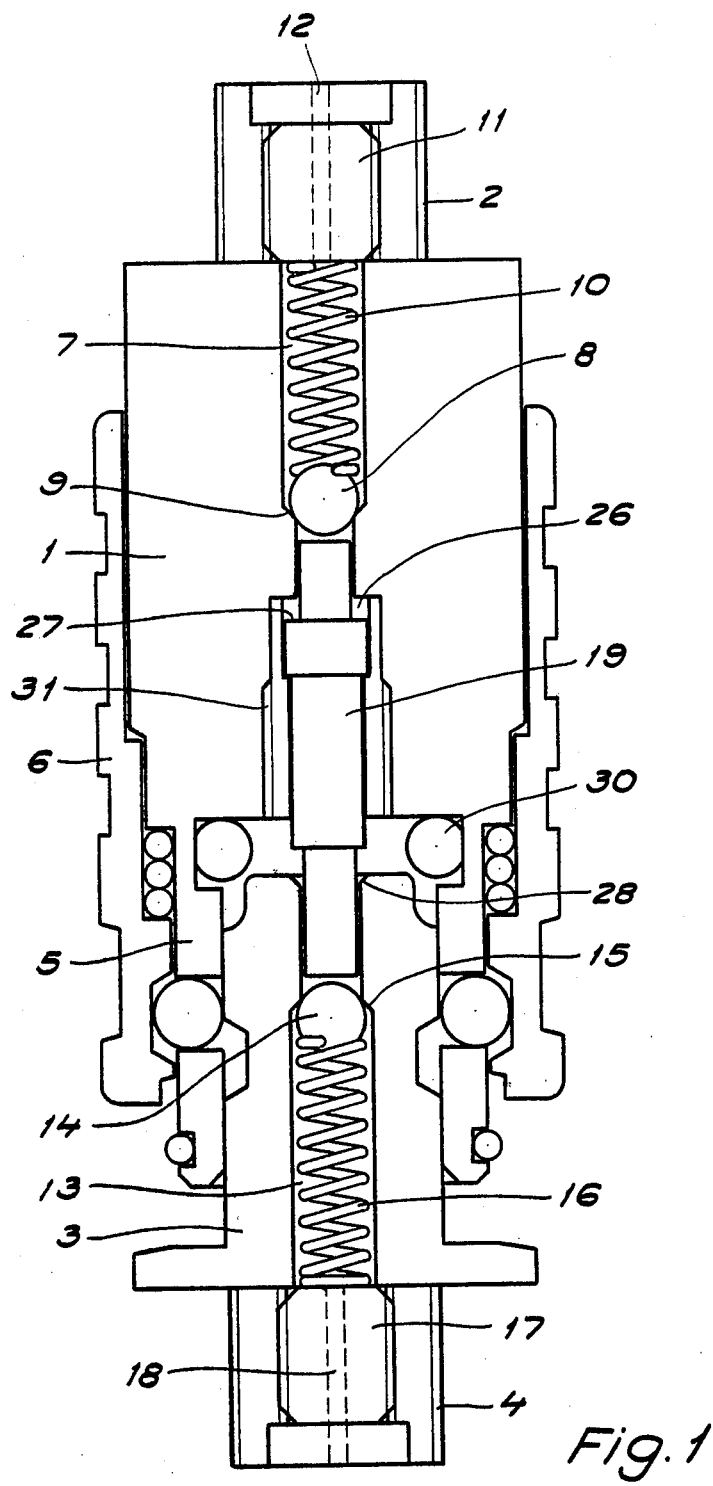
FIG. 1 is a cross-sectional view of the connectable parts of the coupling device but the parts shown as not being fully coupled.

In FIG. 1, a coupling part or first part 1 is shown. The coupling part 1 is provided at one of its ends with a threaded pin 2, by means of which the part can be connected to a pressure recording instrument (not shown). FIG. 1 also shows a nipple or second part 3 which, at its free end, is also provided with a threaded pin 4, by means of which the part may be screwed on to a tube, coupling element, etc. (not shown) forming a part of a system of suitable kind, so that the nipple serves as a measuring point in the mentioned system.

Figure 2:
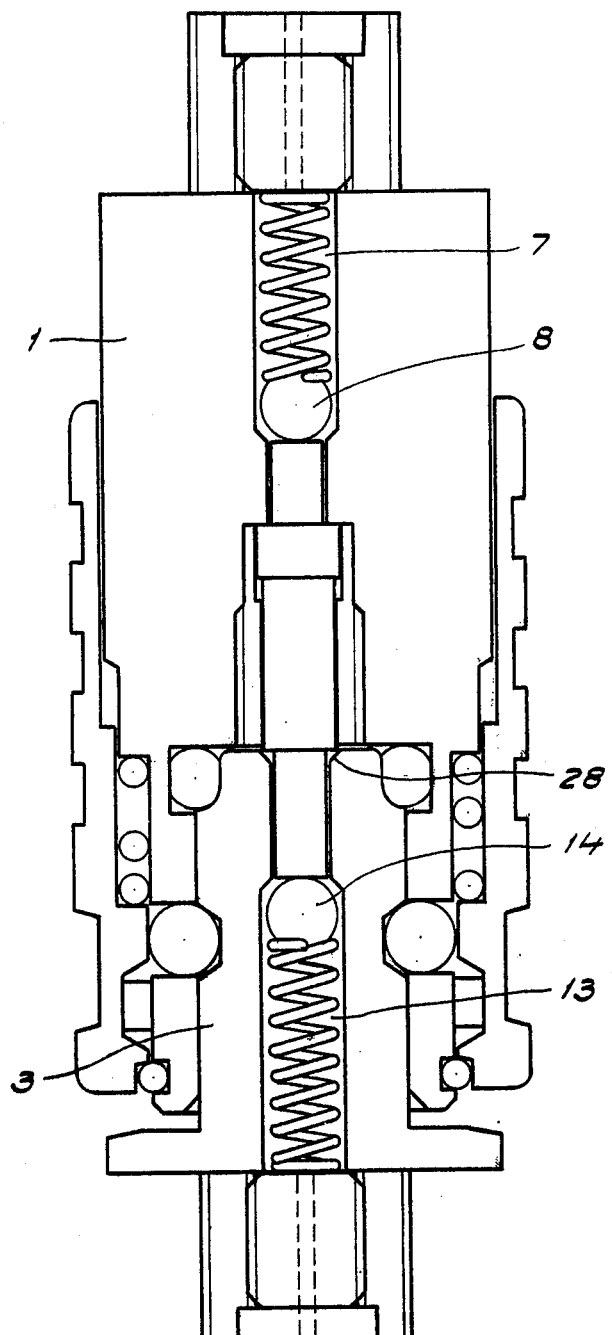
FIG. 2 is a cross-sectional view of the device of FIG. 1 showing the parts in a completely connected position.

The part 1 is provided with a guiding section 5 for the nipple 3, allowing the part to be mated with a corresponding section of the nipple. In FIG. 1 the parts 1 and 3 are shown as not being fully coupled. When fully coupled, as shown in FIG. 2, the parts 1 and 2 can be locked together by outer casing 6. The above-mentioned locking may be accomplished with locking balls in a way which is in itself already known and which has no bearing on the present invention.

The first coupling part 1 is equipped with a first channel 7 and having a first fluid blocking component in the form of a ball 8. Ball 8 in the uncoupled position of the coupling device is pressed against a seat 9 by means of a helical spring 10. The spring 10 is kept in position by a holding screw 11 which is screwed into a threaded hole at the end of pin 2. The holding screw 11 has a central axial through hole via which the fluid medium can pass between the components in the measuring device referred to and the first channel 7 when the ball 8 is displaced from its seat.

The second coupling part 3 comprises in a corresponding way, a second channel 13 and a second fluid blocking component in the form of a ball 14 which is pressed against a seat 15 by a helical spring 16, which is kept in position by a holding screw 17. Screw 17 is screwed into a threaded hole the end of pin 4 and has a central axial through hole via which the medium can pass when ball 14 is displaced from its seat 15.

In order to secure a positive coupling between the first and second channels in response to a single mutual coupling- or connection-movement of the parts 1 and 3, irrespective of the magnitude of the closing forces of the closing components, a push rod or push pin 19 is used. The mentioned closing forces are dependent partly on the springs 10 and 16, partly on the prevalent pressure in the first and second channels, and may thus in the same device differ from one case of connection to another.

The push rod 19 is shown in FIGS. 3a-3d and as being divided in its axial direction into four different sections, designated, respectively, as a first section 20, a second section or flange 21, a third thicker section 22, and a fourth section 23. The sections have different cross-section areas with the exception of the first and fourth sections which, in the example shown have the same cross-section areas.

The end surface 24 of the first section is intended to interact with ball 8, and the end surface 25 is intended to interact with ball 8 when the main coupling parts 1 and 3 are brought together. The push rod 19 is supported in the first part 1 in such a way that it can be moved slightly in its axial direction. The total axial sliding length is determined by the location of the flange 21 which is slidable in a corresponding cavity 26 (FIG. 1) of the first part 1. The length of cavity 26 in the axial direction of part 1 exceeds the corresponding axial length of flange 21 of push rod 19 as mentioned below.

Flange 21 defines a combined stop- and counteracting surface 27 which, at the time of connection of parts 1 and 3 abuts a corresponding surface of cavity 26.

At the moment of coupling of the parts 1 and 3, the rod 19 is axially displaced by means of the force exerted by part 3 which acts through the ball 14 against the surface 25, of rod 19 and/or by means of the force exerted by surface 28 of part 3 as it bears against actuating surface 29 at the end of the third section 22 of the push rod 19.

Referring to the condition presented in FIG. 1, the opening of the channels by the push rod takes place in the following way. When the parts 1 and 3 are mutually brought to their fully coupled positions, the rod will, depending on the outer forces on the connecting parts, be pushed towards that surface of the cavity 26 which is opposite to the stop- and counteracting surface 27, either by the ball 14 or the actuating surface 28. As surface 27 and the corresponding surface in part 1 come into abutting relationship, further movement of rod 19 and thus also of ball 8 is prevented; nevertheless, this action causes ball 8 to be lifted from its seat so that the first channel is opened.

In case the closing force of the ball 14 exceeds the closing force of the ball 8 i.e. in the case when the opening of part 8 has been performed via the closing force of the second part, the interaction between the combined stop and counteracting surface 27 and its corresponding surface on part 1 will ensure that a relative sliding movement will be achieved between the rod and the second part 3 in the act of connection of the parts 1 and 3. Such relative sliding movement between the rod and the second part 3 is of an order of magnitude that guarantees that the ball 14 is lifted from its seat and the second channel is definitely opened.

In the case when the force of the first closing component exceeds that of the second, the relative sliding movement between the rod and the second channel will in the process of connection of the parts 1 and 3 take place first and then the sliding movement proceeds via the acting surface 28 of the rod against part 3 relative to the first part 1.

The maximum displacement movement of the rod in the axial direction, which thus corresponds to the actuating movement of the first closing component, must thus have a magnitude which corresponds at least to the required range of lift for the ball 8 from its seat.

It may, in fact, be advantageous to provide for the maximum displacement of rod 19 to be such as to compensate for future wear of the seat.

Thus, if the range of lift is, for example, 0.3-1.0 mm it is adviseable to increase the value by about 0.5 mm for such wear compensation.

The relative displacement movement between the rod and the second part 3 to provide the actuating movement of ball 14, is determined by the distance between the actuating surface 28 of the second part 3 and the corresponding surface 29 of the rod when the end surface 25 is in contact without pressure with the ball 14. The mentioned distance should also be chosen about 0.5 mm longer than the required range of lift to compensate for wearing of the seat 15. The length of the first, second, third and fourth sections 20–23 should be so dimensioned that the push rod 19 permits a close, sealing engagement between sealing ring 30 and the corresponding surface of the upper end of part 3 as shown in FIG. 2 so that a leak proof connection and disconnection of the parts are secured.

FIG. 2 illustrates the parts 1 and 3 in connected position, from which it can be seen that the balls 8 and 14 are lifted by the push rod from their seats and thus are displaced away from their respective seats. At such time, the establishment of a fluid connection between the channels 7 and 13 is accomplished via the holes in the parts 1 and 3, through which the push rod slides. For this reason, the push rod is designed to allow the medium to pass in its axial direction between the walls of the respective holes in parts 1 and 3 and their envelope surfaces. To accomplish this, the rod is provided with axially extending recesses. At least sections 21 and 23 and preferably also the sections 20 and 22 are provided with such recesses or grooves. In the case where sections 20 and 23 do not have any recesses they are provided with diameters which are smaller than the holes in the parts 1 and 3 to permit the fluid medium to pass by the particular sections in the parts 1 and 3. The mentioned axial recesses on the rod are not shown in FIGS. 1, 2 and 3a for the sake of clarity, but are shown in FIGS. 3b–3d.

Figure 3B:
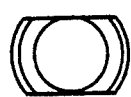
Figure 3D:
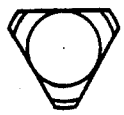

Thus, in FIGS. 3b and 3d, segment-shaped parts of the cross-section have been removed, e.g. by grinding of the parts. It is important that the push rod is guided in its side direction in the first and second parts via preferably most of its sections, the remaining circumferential parts of which are to interact with the walls of the holes or cavities of the parts.

Figure 3C:
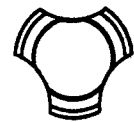

FIG. 3c presents an example of recesses in the form of large concave grooves, the grooves being equally distributed around the circumference of the sections at issue, in that way forming astral or prismatical cross-sections, so that effective guidance is achieved via the remaining outer parts. The dimension and number of recesses of respective section are suitably chosen. In the section of flange 21, they together constitute 40-60 % of the particular cross-section.

Figure 4B:
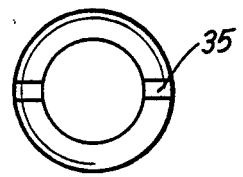
Figure 3A:
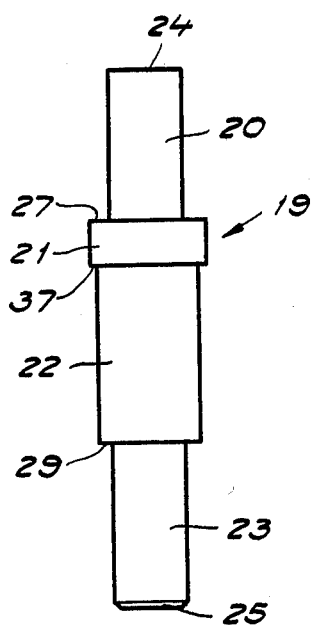
FIG. 3a is a vertical view of a push rod used in the device of FIGS. 1 and 2.
Figure 4A:
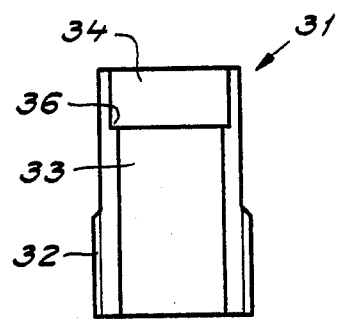
FIG. 4a presents in vertical view and cross-section a holder for the push rod.

To form the cavity 26 of part 1 for receiving the second section 21 of the push rod 19, a holding screw is used; as shown in detail in FIGS. 4a and 4b. The holding screw is intended to be screwed into a threaded hole located at the bottom of the guiding part 5. As may be seen in FIG. 4a, the holding screw has along some part of its length a thread 32 and a through hole which is widened at one end of the screw. In FIG. 4a, the section with the smaller diameter of hole is marked 33 and the widened section 34. A groove for a screw-driver is marked 35. The holding screw is intended to be screwed into the bottom of the hole in part 1, whereby the cavity 26 will be formed by the bottom of the hole of part 1 and the widened section 34 of the holding screw referred to. Part 33 of the hole in the holding screw is intended to enclose the second section 22 of the rod. A shoulder 36 in the hole of the holding screw at the passage between section 33 and 34 is used to restrict the maximum movement of the rod 19 out of part 1. The mentioned shoulder 36 then interacts with yet another stopping surface 37 (FIG. 3a) on the rod.

The mentioned push rod is preferably made of stainless steel; the diameter of the first and fourth sections being about 2.5 mm disregarding recesses if any, whereas corresponding diameters of the second and third sections are about 4.0 and 3.5 mm respectively. The total length of the rod is about 20.0 mm, the fourth section 23 having a length equivalent to about ⅓ of the total length of the rod. The third section is a little longer than the fourth section, whereas the first and second sections together have a length which essentially corresponds to the length of the fourth section. The length of the second section slightly exceeds the half of the first section. The push rod is preferably made of a solid cylinder which is machined to have the above-described shoulders and excesses.

The invention is not limited to the embodiment described and illustrated in the drawing by way of example only, but can be varied as to its details within the sense of the following claims without departing from the fundamental idea of the invention.

What I claim is:

1. Fluid coupling apparatus which is particularly adapted for the detachable connection of fluid pressure responsive equipment to a fluid pressure line at a selected measuring location comprising:

a first coupling part and a second coupling part each defining therein an axial through passage, a fluid flow blocking element for each said coupling part for at times blocking said through passage in the respective coupling part, means in each said coupling part for normally urging the respective blocking element into a fluid flow blocking position relative to the corresponding axial passage, means for releasably engaging said first and second coupling parts with the respective through passages therein being axially aligned in a fluid-tight coupling relationship, actuating means including a push rod defining therein over at least a portion of its length at least one axial groove and being slidably supported in the axially aligned through passages of said first and second coupling parts, means including a portion of reduced cross-sectional area at each end of said rod which is axially movable in a mating bore in a corresponding coupling part, each said portion forming a peripheral shoulder which coacts with an abutment in the respective coupling part to limit thereby the extent of insertion of each end of said rod into the corresponding coupling part in accordance with the length of the respective end of said portion of reduced cross-sectional area and thereby also the extent of movement of the corresponding fluid flow blocking element from its blocking position in response to the coupling of said parts, said push rod having a collar portion over a part of its length which is of greater diameter than that of the remainder of said push rod, an externally threaded bushing member threadably engaging with one of said coupling parts and having an abutment which cooperates with said collar portion on said push rod to limit the extent of withdrawal of said push rod from said one coupling part, said bushing member defining a sleeve portion to slidingly receive a portion of said push rod to thereby guard against tilting movement of said push rod.

2. The apparatus of claim 1 in which each said blocking element comprises a ball urged against a seat defined in the respective through passage.

3. The apparatus of claim 1 wherein said urging means comprises a coil spring in the respective through passage.

* * * * *